G. H. Aylworth,
Hay Press,
№ 101,566. Patented Apr. 5, 1870.
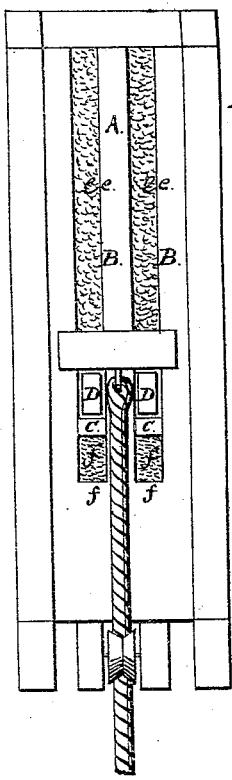
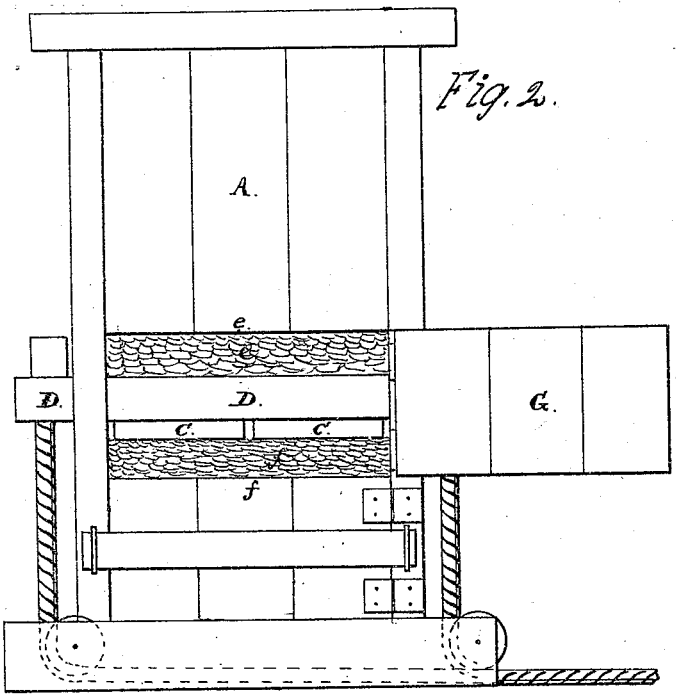
Witnesses.
E. S. Aylworth
B. H. Aylworth
Inventor.
G. H. Aylworth

United States Patent Office.

G. H. AYLWORTH, OF BRIGHTON, ILLINOIS.

Letters Patent No. 101,566, dated April 5, 1870.

IMPROVEMENT IN HAY-PRESSES.

The Schedule referred to in these Letters Patent and making part of the same

*To all whom it may concern:*

Be it known that I, G. H. AYLWORTH, of Brighton, in the county of Macoupin and State of Illinois, have invented certain new and useful Improvements for Pressing and Baling Hay; and I do hereby declare that the following is a full, clear, and exact description thereof, reference being had to the accompanying drawings making part of this specification, and to the letters of refererence marked thereon, like letters indicating like parts wherever they occur.

To enable others skilled in the art to construct and use my invention, I will proceed to describe it and the manner of its operation.

Figure 1 represents a side view.

Figure 2 represents a front view.

I first construct a light oblong frame, A, similar in shape and size to ordinary hay-presses, leaving one or more openings, B, in two opposite sides, extending from one end nearly to the other.

I then make a follower or movable partition, C, consisting of one or more parts. On the top of this I place one or more bars, D, with each end projecting through the openings B, to which is attached the connection to the horse or other motive-power.

In operating my press I first fill it with hay, on which I place the movable partitions or follower C and the bars D. While this is being drawn down I fill in more hay, *e e*. When the first filling *f f* is pressed, I draw out the bars D through the openings B, and the movable partition C through a door, G. I then place them on the top of the second filling *e e*, again filling in hay while this is being pressed, repeating the operation until the desired amount of hay has been put into the press. In this way, by pressing and filling at the same time, I am enabled to bale hay cheaply and rapidly.

The press is light and portable, simple, and convenient in its operation.

It is plain that if the pressure-bars D were not drawn out endwise through the slot-ways B, but were raised up to the top of the slots, as in position for beginning to press, then the hay filled in above the bars D, while passing, would be carried up, and, to a great extent, be thrown out of the press-box; besides, this superincumbent mass to the bars D would be a mere additional frictional resistance to the up-stroke of the bars.

It is, therefore, evident that the important advantage of feeding in the hay to the press while the pressure-bars descend depends for its practicability on the withdrawal of the pressure-bars from the press altogether when the lower limit of stroke is reached. Of course a duplicate set of pressure-bars will be used in practice.

Having thus fully described my invention,

What I claim is—

The arrangement of a press with a vertical frame, A, vertical side slots B, door G, and follower-boards C, in combination with pressure-bars D, when these are arranged to be withdrawn from the press at the lower end of stroke, substantially as set forth.

G. H. AYLWORTH.

Witnesses:
  H. H. HERDMAN,
  O. A. CHASE.